United States Patent
De Rooij et al.

(10) Patent No.: US 6,217,812 B1
(45) Date of Patent: Apr. 17, 2001

(54) METHOD FOR PRODUCING PLATE-SHAPED COMPONENTS OR COMBINATIONS OF COMPONENTS

(75) Inventors: Robert De Rooij, Petten; Pieter Nammensma, Heerhugowaard, both of (NL)

(73) Assignee: Stichting Energieonderzoek Centrum Nederland, Le Petten (NL)

( * ) Notice: Subject to any disclaimer, the term of this patent is extended or adjusted under 35 U.S.C. 154(b) by 0 days.

(21) Appl. No.: 09/194,360

(22) PCT Filed: May 29, 1997

(86) PCT No.: PCT/NL97/00301

§ 371 Date: Nov. 25, 1998

§ 102(e) Date: Nov. 25, 1998

(87) PCT Pub. No.: WO97/45886

PCT Pub. Date: Dec. 4, 1997

(30) Foreign Application Priority Data

May 30, 1996 (NL) .................................................. 1003238

(51) Int. Cl.[7] .............................. C08F 6/24; B29C 39/02; B29C 70/60
(52) U.S. Cl. ............................ 264/300; 264/302; 205/352
(58) Field of Search .................................. 264/299, 302, 264/300, 104; 205/343, 352; 528/485, 489, 495, 499

(56) References Cited

U.S. PATENT DOCUMENTS

| | | | | |
|---|---|---|---|---|
| 4,430,397 | * | 2/1984 | Untereker | 429/310 |
| 4,581,302 | | 4/1986 | Vine et al. . | |
| 4,720,334 | * | 1/1988 | DuBois et al. | 204/296 |
| 4,810,345 | * | 3/1989 | Schulz et al. | 204/296 |
| 5,324,333 | * | 6/1994 | Doniat et al. | 429/217 |
| 5,830,603 | * | 11/1998 | Oka et al. | 429/249 |
| 6,087,032 | * | 6/2000 | Yoshitake et al. | 429/33 |

FOREIGN PATENT DOCUMENTS

| | | |
|---|---|---|
| 28 29 901 | 1/1980 | (DE) . |
| 40 30 945 | 4/1992 | (DE) . |
| 231 863 | 8/1987 | (EP) . |
| 509 424 | 10/1992 | (EP) . |
| 661 767 | 7/1995 | (EP) . |
| WO 96/08050 | 3/1996 | (WO) . |

* cited by examiner

Primary Examiner—Angela Ortiz
(74) Attorney, Agent, or Firm—Sughrue, Mion, Zinn, Macpeak & Seas, PLLC

(57) ABSTRACT

Method for producing a plate-shaped component. This involves the preparation of a first suspension comprising an alcohol as the dispersing medium and a base material for the plate. A second suspension is prepared which comprises binder, water as the gelling agent and an alcohol as the dispersion medium, possibly with the addition of Li/K or Li/Na carbonate. These two suspensions are mixed together, possibly with the addition of fibers. After mixing, a plate-shaped component is fabricated with the aid of the "tape casting" technique.

16 Claims, 1 Drawing Sheet

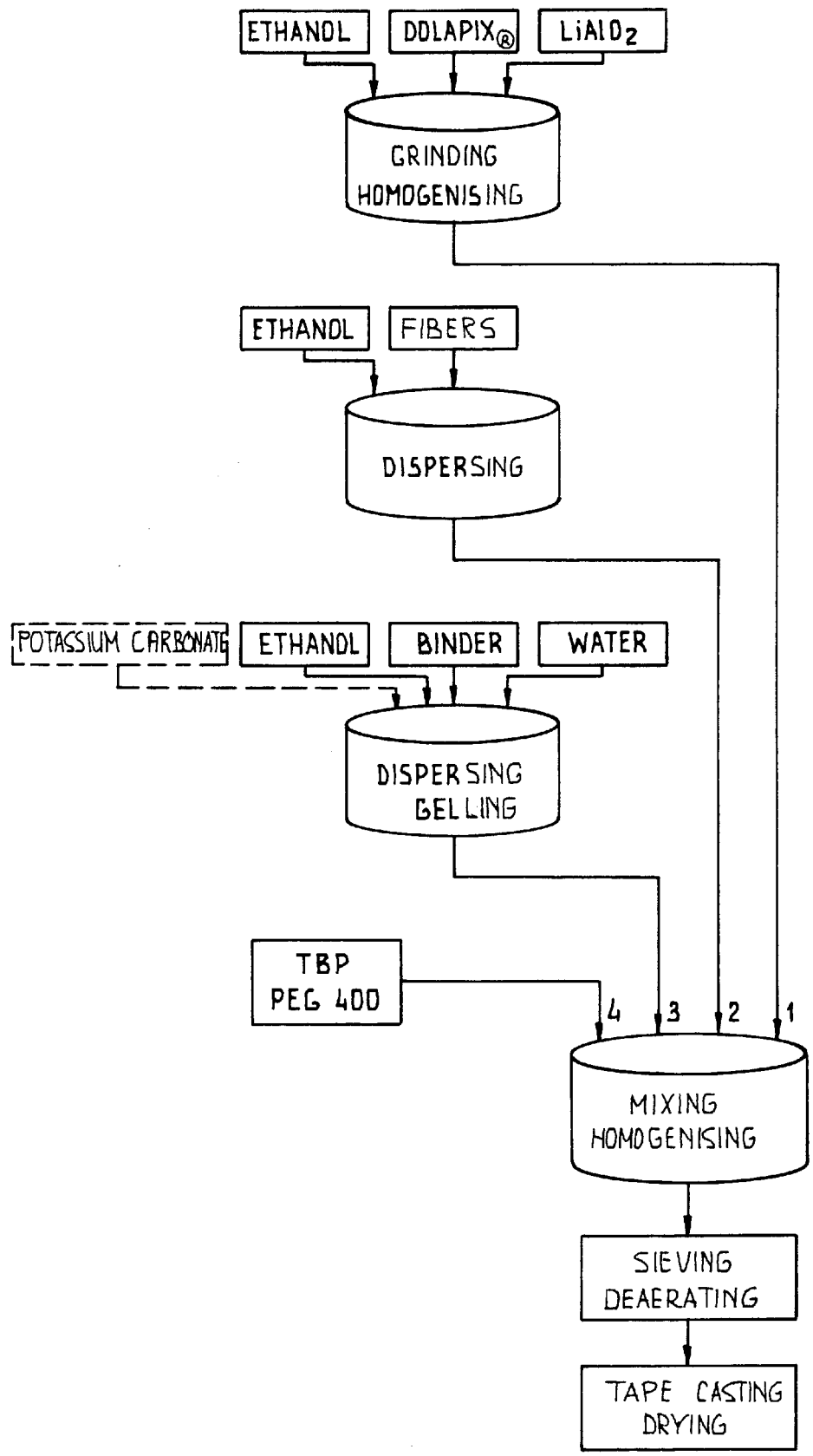

METHOD FOR PRODUCING PLATE-SHAPED COMPONENTS OR COMBINATIONS OF COMPONENTS

BACKGROUND OF THE INVENTION

The present invention relates to a method in accordance with the preamble of claim 1.

Such a method is disclosed in the PCT application Wo 96/08050.

Various proposals exist in the prior art for producing, for example, a matrix plate in a fuel cell.

The oldest proposal comprises the so-called hot press technique. In a comparatively complicated manner this technique yields comparatively thick plates. The result of this, on the one hand, is an increase in production costs and, on the other hand, a reduction in the efficiency of the cell.

An alternative for producing matrix plates is a process which is similar to the papermaking process. This involves mixing pulp comprising a binder, water and the supporting materials of the matrix. The matrix material then adheres to the pulp, giving rise to floccules. Via the filtration process the floccules are separated from the water material, and the binder is removed by subsequent baking. This process is attractive since the suspension medium used is inexpensive, environment-friendly water. A drawback is its controllability and, in particular, the pore size and the pore size distribution. It did not prove possible to fabricate matrix plates reproducibly in this way on a commercially acceptable scale.

The third most commonly used technique is the so-called "tape casting".

This involves a suspension in which a binder, fibres and the matrix material are present being cast onto a flat table and the suspension medium present therein being evaporated. A green matrix plate is then produced which can either be sintered before being placed into a fuel cell, after which the electrolyte can be introduced, or is placed directly into the fuel cell. In the latter case the electrolyte is introduced in some other way.

When the suspension was being prepared it was not uncommon to employ vacuum conditions in order thus to regulate the viscosity of the fluid.

Such a method is described, for example, in the article "Review of Carbonate Fuel Cell Matrix and Electrolyte" by H. C. Maru et al. in Proceedings of 2nd Symposium on MCFC Technology, Vol. 90–16, pp. 121–136. The binder described therein was dissolved in a mixture of xylenes and ethanol. When the suspension is heated there is the problem, in particular, of removing xylene. It is no longer permissible for a solvent such as xylene to be discharged into the environment, and recycling leads to a considerable increase in costs.

A similar consideration applies to the use of acrylate as a binder which is dissolved in a mixture of acetone, dichloromethane and petroleum naphtha.

In the case of the method described in the abovementioned PCT application 96/08050 it was found that in the process of forming that suspension, solid particles will agglomerate, resulting in a decrease in the strength of the tape. This is caused by uneven dispersion of the additions and a pore structure which is not well defined. Moreover the introduction of additions such as fibre strengtheners, dissolution retardants and carbonate proved particularly difficult. Upon introduction of such substances agglomeration has likewise been observed, which counteracts the strength, on the one hand, and the dispersal of these substances, on the other hand.

Moreover it was found that this production gives rise to rejects and waste which cannot be put to any further use.

SUMMARY OF THE INVENTION

The object of the present invention is to avoid these drawbacks.

This object is achieved by means of the characterizing measures of claim 1.

By preparing two ancillary suspensions and then mixing these, it was found, surprisingly, that agglomeration of solids does not occur. Moreover, the above-described additions can readily be added to the suspension in question without the risk of agglomeration or inhomogeneities, as the case may be.

Should one of the two suspensions not meet the set requirements, it can be readily recycled.

The above-described method requires less aftertreatment (such as rolling) and makes it possible for production rejects or waste to be used directly a starting material. In the process, production waste after "tape casting" can be reused by the addition of water/alcohol mixture; the gelled binder present is water-soluble. In the case of other binder systems such as acrylates this is not possible. In this context it must be ensured that the properties of the plate-shaped component obtained are uniform and adjustable, in a simple manner, as a function of the requirements imposed thereon, such as pore size and thickness.

This object is achieved in the case of an above-described method by a first suspension being prepared, comprising an alcohol as the dispersion medium and the base material, by a second suspension being prepared, comprising the binder and an alcohol as the dispersion medium m and water as the gelling medium, and these two separately prepared suspensions being mixed with one another before being cast.

By using a different dispersant gelling agent/binder system, the binder suspension and the suspension which comprises the material of the component being fabricated it proved possible to dispense with organic solvents other than alcohols.

In contrast to the view held in the prior art (see for example the article "Physical Property Optimization of Lithium Aluminates for Fabrication of Molten Carbonate Fuel Cell Matrices" by Patrick M. Brown in Fuel Cell Seminar 1990, pp. 289–293) the addition of water needs not to have a negative effect on the results obtained with a suspension prepared in this manner which is then cast.

It was found that a component which, in the abovementioned manner, was fabricated from suspensions on a water/alcohol basis with the aid of the "tape casting" technique, can be held in intermediate storage for considerably longer, be produced more cheaply and results in less pollution of the environment than a plate which has been fabricated with the aid of an acrylate binder system.

It was found, moreover, that if this dispersant/gelling agent/binder is used, production rejects can be used directly as a starting material.

Employing a dispersing/gelling agent/binder system on the basis of water-alcohol mixtures makes it possible to use suspensions within a wide viscosity range of 500–3500 cPs, preferably 1000–20000 cPs of the various suspensions. As a result it is no longer necessary to employ a vacuum for precise regulation of the viscosity of the suspension.

The amount of water added to the gelling binder suspension is preferably at least 10–25 times the weight of the binder.

If a surfactant is added to prevent coagulation, this is preferably introduced into the first above-described suspension.

The first suspension may comprise any of the granular materials known from the prior art. Examples to be mentioned are: nickel, nickel oxide, nickel aluminum, both alloyed and intermetallic, lithium cobaltate, chromium, lithium aluminate and aluminium oxide, and also other metals or metal oxides in the form of powders or fibres. The solid may also consist of mixtures of the abovementioned substances.

The use in an MCFC cell and more in particular as a matrix plate involves, as generally known in the prior art, ($\gamma$-)lithium aluminate. By employing the "tape casting" technique it is possible to cheaply fabricate comparatively thin plate-shaped components which after drying can be used directly in the cell. The low thickness can result in optimum capacity of e.g. a fuel cell.

It is also possible for the plate-shaped component fabricated by means of the "tape casting" technique then to be baked or sintered and then to add an electrolyte to the said component in some way known from the prior art, if the plate-shaped component is employed as an electrode or matrix in an electrochemical cell.

Such an addition may comprise impregnation with e.g. an electrolyte material. It is also possible for a layer of solid carbonate to be placed into a fuel cell between, for example, two plates and for the fuel cell to be heated subsequently, as a result of which the carbonate material, which then melts, is absorbed into the plates by capillary action.

The latter method faces difficulties, however, if a comparatively tall fuel cell stack, i.e. an electrochemical pile comprising a large number of cells has to be fabricated. The risk of tilting when the carbonate is melted and possibly incorrect assembly is increased by the increase in the number of components.

The first method described, where after baking or sintering of the component a suspension of the electrolyte is added, has the drawback that renewed heating is required afterwards. Such a method is comparatively complicated and increases the costs.

Using the above-described method according to the invention it proved possible, however, to add an electrolyte suspension to the binder suspension. If the carbonate material is employed, this again does not require the use of organic solvents other than alcohols.

As well as with material which subsequently provides the electrolyte, the second suspension may also be admixed with a material which changes or regulates the degree of acidity of the electrolyte. Thus the dissolution rate of the cathode in the electrolyte of e.g. an MCFC cell can be controlled. Examples of such an agent are lithium ferrite and salts of alkaline earth metals.

By integrating the absorption of the electrolyte into the production of the plate-shaped component it is possible to achieve considerable simplification of the various process steps, while in addition the drawbacks deriving from the use of the large number of components in the case of carbonate material being fused in situ during the start-up of a fuel cell are avoided.

The electrolyte suspension will be chosen as a function of the electrolyte to be obtained. If the electrolyte comprises carbonate material, as in the case of an MCFC cell, preference is given to the use of a mixture of $Li_2CO_3$, $Na_2CO_3$ and $K_2CO_3$ in any desired ratio.

The above-described first and second suspension may be admixed with various aids generally used in the prior art. Thus it is possible to add an anti-foaming agent and/or release agent and/or plasticizer.

The alcohols used may likewise comprise all the alcohols known from the prior art, but in view of feasibility and cost price preference is given to ethanol.

It is possible for fibres to be incorporated in the first suspension when the matrix plates are being fabricated, to strengthen the component.

The fibres used may, apart from the aluminium oxide mentioned, comprise any fibre known from the prior art. These may or may not be ground before use.

However, it is also possible to prepare a separate third suspension consisting of a dispersion of fibres and an alcohol. The fibres used may comprise, for example, aluminium oxide materials or lithium aluminate fibres, and the alcohol may comprise ethanol, as specified above.

If the abovementioned method is used for producing components of an MCFC fuel cell, and more in particular the cathode thereof, it is advisable to add agents during the preparation, which retard dissolution of the cathode and more in particular of the NiO therein. Worth mentioning, for example, is an alkaline earth metal carbonate. One example is a mixture comprising roughly equal proportions of lithium and sodium carbonate, which is admixed with small amounts of calcium, strontium and/or barium carbonate.

The invention is explained below in more detail with reference to the flow diagram according to the only figure and to examples.

In the figure, the above-described method is explained in a flow diagram.

This shows that for the purpose of e.g. the production of the matrix plate during a first step a mixture comprising ethanol, Dolapix (an anticoagulant) and lithium aluminate is ground and homogenized. The ethanol may be denatured, i.e. contain about 4% of methanol.

Grinding can be carried out batchwise or continuously. In the case of batchwise grinding a ball mill, for example, is preferably used, and in the case of continuous grinding an attritor, for example.

It will be understood that instead of lithium aluminate other materials can be used which are generally known from the prior art.

BRIEF DESCRIPTION OF THE INVENTION

In addition to the preparation of the first suspension, a second and third suspension are also prepared.

DETAILED DESCRIPTION OF THE PREFERRED EMBODIMENT

The second suspension comprises ethanol, a binder and water. This binder is dispersed and gelled. The second suspension may additionally be admixed, as indicated by dotted lines, with lithium/potassium or lithium/sodium carbonate or any other agent which provides the electrolyte. The third suspension comprises ethanol and fibres. Then the three suspensions thus obtained are mixed, with the addition of TBP (tributyl phosphate) or some other anti-foaming agent and release agent and PEG (polyethyleneglycol) or any other plasticizer.

It will be understood that the various grinding and homogenization steps or gelling steps, respectively, are essential and that the formation of lumps or agglomerates must be precluded as far as possible.

The mixture obtained is then mixed again and homogenized, screened, freed from air and then applied by means of the "tape casting" technique, followed by drying.

De-aeration is important since there is the possibility of air bubbles being incorporated into the suspension during the various processing steps. Should no other steps be taken there is the risk of so-called pinholes forming in the component.

EXAMPLE I

To prepare 12 liters of casting suspension, to be used in the "tape casting" technique, three different suspensions were prepared.

The first suspension consisted of 3,000 g of ethanol, 70 g of Dolapix ET 85 and 2800 g of $LiAlO_2$ powder. Dolapix is produced by SERVA in Heidelberg, Germany. To prepare the first suspension, ethanol and Dolapix were poured into a stock vessel, followed by the addition, with continuous mixing, of the lithium aluminate powder, and the suspension obtained was then ground in an attritor with the aid of a pumped-circulation system. The grinding time was about 4 hours, after which an average desired particle size of 2 µm was obtained.

To prepare the second suspension, 1500 g of ethanol were weighed, as were 140 g of methylcellulose as the binder. The methylcellulose was dispersed in the ethanol over a period of 5–10 minutes, after which 1820 g of demineralized water were added, followed by stirring for at least 60 minutes.

The third suspension was prepared by weighing 325 g of $Al_2O_3$ fibres and 900 g of methylated ethanol.

Aluminium oxide fibres were added to the ethanol with stirring. The stirring time was 30 minutes.

Then these three suspensions were mixed together with stirring. The stirring time was 10 minutes, followed by the addition of 60 g of TBP and 820 g of PEG. TBP and PEG are available from Merck under the order numbers 818604 and 817003-50003, respectively. The suspension ultimately obtained was screened through a 500 µm screen and then de-aerated in a closed vessel by the suspension being rolled slowly for 60 minutes on a roller frame. Then the suspension was cast with the aid of the "tape casting" technique. This produced a matrix plate which was not provided with electrolyte.

EXAMPLE II

To fabricate an anode, the following ingredients were added successively in a 6.5 liter vessel with constant stirring at 320 rpm: 2340 g of ethanol (5% methanol) and 65 g of methylcellulose. After 1 minute's stirring, 1287 g of demineralized water was added, and after continued stirring for 10 minutes, 39.0 g of Tween 20 and 39.0 g of TBP. TBP can be obtained from Serva as mentioned above. The methylcellulose used was grade "MC-A4C" available from Dow Chemical.

The above-described mixture was mixed well and then, via a vibrating hopper which moved at a frequency of 6.5 Hz, admixed with 520 g of fine Cr. This Cr powder is available from Johnson Matthey. During the addition stirring proceeded at 340 rpm. Then, at a rotational speed of 360 rpm, 4680 g of Ni 287 from Inco Europe Limited, London were added.

Stirring then continued for 55 minutes at 380 rpm, after which 260 g of ethanol (5% methanol) and 143 g of demineralized water were added. Stirring then continued for 5 minutes, after which the suspension was rolled for 60 minutes in a closed vessel at 60 rpm. The mixture thus obtained was used for the "tape casting" technique, of course after viscosity and temperature had been measured. This was followed by drying, and the dried tape was then cut to size.

EXAMPLE III

The same method as in Example II was followed for the fabrication of the cathode, except that 2800 g of ethanol per 71 g of methylcellulose were added. After the said stirring for 1 minute, 1633 g of demineralized water were added, and after the mixture thus produced had been stirred, 47.0 g of Tween 20 and 47.0 g of TBP were added.

The vibrating hopper was used, while stirring took place with increasing speed, to add 3500 g of Ni 255 (available from Inco Europe Limited). After the said stirring for 30 minutes at 380 rpm, the suspension was poured into a 6.5 l vessel, followed by rolling for 60 minutes at 60 rpm. Then the green cathode was prepared with the aid of the "tape casting" technique.

Although the invention has been described above with reference to a preferred embodiment, it will be understood that this can be modified in numerous ways without moving outside the scope of the present invention as described in the appended claims.

What is claimed is:

1. A method for producing a plate-shaped component electrode or matrix plate of a fuel cell used at high temperature, comprising the preparation of a suspension comprising a base material for the plates, fibres, binders/gelling agents and an alcohol, which suspension is cast by means of a tape casting technique, after which the alcohol is removed from the suspension, a suspension being prepared which comprises an alcohol as a dispersion medium, the base material and the binder, wherein the preparation of the suspension comprises:

preparing a first suspension comprising an alcohol or dispersion medium and the base material;

preparing a second suspension comprising the binder and a water/alcohol as dispersant/gelling agent, and mixing said first and second suspensions.

2. A method according to claim 1, characterized in that the second suspension contains at least 10–25 times the weight of water, based on the weight of the binder.

3. A method according to claim 1, wherein the first suspension is admixed with an anticoagulant.

4. A method according to claim 1, wherein the mixture of the first and second suspensions is admixed with a release agent and/or an anti-foaming agent.

5. A method according to claim 1, wherein the first suspension has $LiAlO_2$ introduced into it and the plate-shaped component comprises the matrix plate in an MCFC cell.

6. A method according to claim 1, wherein the plate-shaped component comprises an electrode in an MCFC cell.

7. A method according to claim 6, comprising the cathode of an MCFC cell, to which agents are added which retard dissolution of the cathode material.

8. A method according to claim 1, wherein the component is used in an MCFC cell, and wherein the second suspension is admixed with carbonate material in solution.

9. A method according to claim 8, wherein the carbonate material may comprises carbonate salts or alkali metals in a mixing ratio.

10. A method according to claim 8, wherein the second suspension contains at least 10–25 times the weight of water, based on the weight of the binder.

11. A method according to claim 1, wherein the mixture of the first and second suspension is admixed with a plasticizer.

12. A method according to claim 1, wherein the alcohol comprises ethanol.

13. A method according to claim 1, wherein fibres are added as a third suspensions dispersed in an alcohol, the said third suspension being added to the first and second suspension.

14. A method according to claim 1, wherein the fibre material used comprises $Al_2O_3$ or $LiAlO_2$ fibres.

15. A method according to claim 1, wherein after mixing of the suspensions and prior to tape casting the mixture obtained is screened and de-aerated.

16. A method according to claim 1, wherein the base material for the plates consists of production rejects.

* * * * *